Patented Dec. 1, 1931

1,834,747

UNITED STATES PATENT OFFICE

WILLIAM E. STOKES, OF BROOKLYN, AND REGINALD A. WRIGHT, OF CEDARHURST, NEW YORK, ASSIGNORS TO ROYAL BAKING POWDER COMPANY, OF NEW YORK, N. Y., A CORPORATION OF NEW JERSEY

EFFERVESCENT MIXTURE

No Drawing.   Application filed September 11, 1928.   Serial No. 305,315.

The invention relates to effervescent mixtures and particularly those used as leavening agents commonly called baking powders; and its principal object is to provide baking powders wherein the rate of reaction is controlled in accordance with specific requirements and the gas is made properly and fully available for vesiculation in baking, without the use of expensive ingredients or imparting unpalatableness or unwholesomeness to the food.

Baking powders consist essentially of a mixture of bicarbonate of soda (or an equivalent therefor) and an acid reacting material, as a suitable tartrate or phosphate, to which is commonly added a "filler" of starch or the like. Among other acid reacting materials, mono-calcium phosphate has been used, but it has not satisfactorily met practical requirements because the mixture has insufficient stability and results in too rapid evolution of gas when water or other liquid is added thereto. For instance, a mixture of mono-calcium phosphate and bicarbonate of soda in suitable proportions, having 14% available gas, has been found to evolve more than one-half its gas within one minute of the addition of water thereto. Partly on account of the unsuitability of such a mixture to satisfactory baking, attempts have been made to use acid pyro-phosphate in lieu of mono-calcium phosphate. Such a mixture evolves its gas somewhat more slowly, about 5 of the 14% available gas being evolved within a minute of the addition of water. That advantage has lead to a considerable use of such mixtures by bakers. But the use has been chiefly in connection with sweet bakery products because the acid pyro-phosphate imparts a taste (describable as metallic or bitter) to the food unless it is masked by the sweetness.

We have discovered that when a salt of calcium or other alkaline earth metal is added to acid pyro-phosphate as an ingredient or ingredients of the mixture, the objectionable taste is eliminated and the rate of evolution of the gas may be materially reduced and brought within control to meet specific requirements. For instance, in mixtures having 14% available gas, 7.20% was evolved within a minute of the addition of water where the acid reacting constituent was mono-calcium phosphate; 5% where it was sodium acid pyro-phosphate; 1.65% where the pyro-phosphate was mixed with 10% mono-calcium phosphate; and 0.55% where the pyro-phosphate was mixed with 10% calcium lactate; with comparable results where other salts of calcium or magnesium were employed.

The addition of the alkaline earth metal thus enables the rate of evolution of gas to be controlled to suit specific requirements in baking. Mixtures wherein the gas is evolved rapidly on the addition of water, lose some of the available gas while the dough is being mixed and much of the remaining gas is evolved too rapidly for effective vesiculation. The present invention contemplates that the amount of calcium or other alkaline earth metal salt may be varied to obtain the rate of gas evolution best suited to particular requirements. A typical formula giving a baking powder which has proved well-suited to typical conditions is:—

| | Parts |
|---|---|
| Sodium bicarbonate | 300 |
| Mono-calcium phosphate | 38 |
| Sodium acid pyro-phosphate | 405 |
| Starch | 262 |

In making the mixture it has been found preferable first to mix the calcium salt and pyro-phosphate together, and then mix that mixture with the other ingredients.

In addition to providing the baking powder wherein the rate of reaction may be controlled to meet specific requirements, the invention provides a baking powder having superior keeping properties substantially unimpaired under climatic conditions which deteriorate other baking powders, and one which may be produced without undue cost and used without imparting objectionable taste or unwholesomeness to the food.

The baking powder may be packaged for household use in the usual cans, and its character lends itself particularly to use without such packaging by bakers and other large users of such mixtures. It is to be understood however, that in one aspect our invention includes the novel mixture of acid pyrophosphate and salt of calcium or other alkaline earth metal, which mixture is adapted for use with sodium bicarbonate to produce a chemical leavening mixture, and since certain changes may be made in the above composition of matter and different embodiments of the invention may be made without departing from its scope; it is intended that all matter contained in the above description shall be interpreted as illustrative and not in a limiting sense.

It is also to be understood that the following claims are intended to cover all of the generic and specific features of the invention herein described and all statements of the scope of the invention which as a matter of language might be said to fall therebetween; and that they are intended to be inclusive in scope and not exclusive, in that if desired other materials may be added to my novel composition of matter herein claimed without departing from the spirit of the invention. Particularly it is to be understood that in said claims ingredients or components recited in the singular are intended to include compatible mixtures of said ingredients wherever the sense permits.

We claim:

1. A baking powder comprising sodium bicarbonate, an amount of acid pyro-phosphate substantially sufficient to react therewith to liberate the gas, and an amount of a salt of an alkaline earth metal sufficient to retard the rate of said reaction.

2. A baking powder comprising sodium bicarbonate, an amount of acid pyro-phosphate substantially sufficient to react therewith to liberate the gas, and an amount of a calcium salt sufficient to retard the rate of said reaction.

3. A baking powder comprising sodium bicarbonate, an amount of acid pyro-phosphate substantially sufficient to react therewith to liberate the gas, and an amount of mono-calcium phosphate sufficient to retard the rate of said reaction.

4. A baking powder comprising sodium bicarbonate, an amount of acid pyro-phosphate substantially sufficient to react therewith to liberate the gas, and an amount of an alkaline earth metal salt of lactic acid sufficient to retard the rate of said reaction.

5. A baking powder comprising sodium bicarbonate, an amount of acid pyro-phosphate substantially sufficient to react therewith to liberate the gas, and an amount of calcium lactate sufficient to retard the rate of said reaction.

6. A baking powder comprising sodium bicarbonate, an amount of acid pyro-phosphate substantially sufficient to react therewith to liberate the gas, and an amount of calcium lactate and mono-calcium phosphate sufficient to retard the rate of said reaction.

7. As an improved article of manufacture a composition of matter adapted for admixture with sodium bicarbonate to form a chemical leavening mixture, said composition of matter comprising acid pyro-phosphate and an amount of a salt of an alkaline earth metal sufficient to retard the rate of the reaction between the acid pyro-phosphate and the bicarbonate.

8. As an improved article of manufacture a composition of matter adapted for admixture with sodium bicarbonate to form a chemical leavening mixture, said composition of matter comprising acid pyro-phosphate and an amount of a calcium salt sufficient to retard the rate of the reaction between the acid pyro-phosphate and the bicarbonate.

9. As an improved article of manufacture a composition of matter adapted for admixture with sodium bicarbonate to form a chemical leavening mixture, said composition of matter comprising acid pyro-phosphate and an amount of mono-calcium phosphate sufficient to retard the rate of the reaction between the acid pyro-phosphate and the bicarbonate.

10. As an improved article of manufacture a composition of matter adapted for admixture with sodium bicarbonate to form a chemical leavening mixture, said composition of matter comprising acid pyro-phosphate and an amount of an alkaline earth metal salt of lactic acid sufficient to retard the rate of the reaction between the acid pyro-phosphate and the bicarbonate.

11. As an improved article of manufacture a composition of matter adapted for admixture with sodium bicarbonate to form a chemical leavening mixture, said composition of matter comprising acid pyro-phosphate and an amount of calcium lactate sufficient to retard the rate of the reaction between the acid pyro-phosphate and the bicarbonate.

12. As an improved article of manufacture a composition of matter adapted for admixture with sodium bicarbonate to form a chemical leavening mixture, said composition of matter comprising acid pyro-phosphate and an amount of calcium lactate and mono-calcium phosphate sufficient to retard the rate of the reaction between the acid pyro-phosphate and the bicarbonate.

WILLIAM E. STOKES.
REGINALD A. WRIGHT.